(12) United States Patent
Nair et al.

(10) Patent No.: US 11,556,600 B2
(45) Date of Patent: Jan. 17, 2023

(54) GENERALIZING A SEGMENT FROM USER DATA ATTRIBUTES

(71) Applicant: salesforce.com, inc., San Francisco, CA (US)

(72) Inventors: Vineeth Anand Nair, Fremont, CA (US); Jason Day, Fortville, IN (US); Narinder Singh, Medina, WA (US); Noah Bruce Guyot, Mill Valley, CA (US); Aaron M. Popelka, San Francisco, CA (US); Kasia Fichtner, Moraga, CA (US); Shengfan He, West New York, NJ (US); Pam Walquist, Carmel, IN (US)

(73) Assignee: Salesforce, Inc., San Francisco, CA (US)

( * ) Notice: Subject to any disclaimer, the term of this patent is extended or adjusted under 35 U.S.C. 154(b) by 205 days.

(21) Appl. No.: 16/779,333

(22) Filed: Jan. 31, 2020

(65) Prior Publication Data

US 2020/0394237 A1 Dec. 17, 2020

Related U.S. Application Data

(60) Provisional application No. 62/861,953, filed on Jun. 14, 2019.

(51) Int. Cl.
*G06F 7/02* (2006.01)
*G06F 16/00* (2019.01)
*G06F 16/9535* (2019.01)
*G06F 16/242* (2019.01)
*G06F 16/9538* (2019.01)
*G06Q 30/00* (2012.01)
*G06F 16/2458* (2019.01)

(52) U.S. Cl.
CPC ...... *G06F 16/9535* (2019.01); *G06F 16/2428* (2019.01); *G06F 16/9538* (2019.01); *G06F 16/2465* (2019.01); *G06Q 30/016* (2013.01)

(58) Field of Classification Search
CPC ............. G06F 16/9535; G06F 16/2428; G06F 16/9538; G06F 16/22; G06F 16/2465; G06Q 30/016
See application file for complete search history.

(56) References Cited

U.S. PATENT DOCUMENTS 10,467,240 B2 * 11/2019 Clifford .............. G06F 3/04842
11,048,766 B1 * 6/2021 Chen ................... G06F 16/9014
(Continued)

*Primary Examiner* — Bruce M Moser
(74) *Attorney, Agent, or Firm* — Holland & Hart LLP

(57) ABSTRACT

A data server may support segment identification based on a selected user profile. For example, a user may select a user profile as the basis for identifying a segment of additional user profiles. The server may identify attributes associated with the selected user identifier and generate an expression based on the identified subset. The expression may include a normalization function corresponding to at least one attribute. The normalization function may identify correlated attribute values for an attribute associated with the selected user profile. The data server may query a data storage system to identify the additional user profiles based on the expression. The data server may also support user defined Boolean expressions such that the expression is used to identify user identifiers associated with a first attribute and a second attribute.

15 Claims, 11 Drawing Sheets

(56) References Cited

U.S. PATENT DOCUMENTS

2015/0169774 A1\* 6/2015 Budzienski ....... G06F 16/24578
 707/734
2017/0262895 A1\* 9/2017 Hirasawa ................ G06F 16/93
2020/0117758 A1\* 4/2020 Lu ............................ G06N 5/02

\* cited by examiner

GENERALIZING A SEGMENT FROM USER DATA ATTRIBUTES

CROSS REFERENCES

The present application for patent claims priority to U.S. Provisional Patent Application No. 62/861,953 by Nair et al., entitled "GENERALIZING A SEGMENT FROM USER DATA ATTRIBUTES," filed Jun. 14, 2019, assigned to the assignee hereof.

FIELD OF TECHNOLOGY

The present disclosure relates generally to database systems and data processing, and more specifically to generalizing a segment from user data attributes.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform application may aggregate and analyze attributes or other data of an individual and display this information in a user interface of the application. However, the application may be limited in its functionality with respect to leveraging the individual's collected information thereby limiting the utility of the application. Moreover, the application may be limited in the types of queries it can support, by for example having a limited functionality of searching for records by a single attribute at a time.

DETAILED DESCRIPTION

Figure 1:
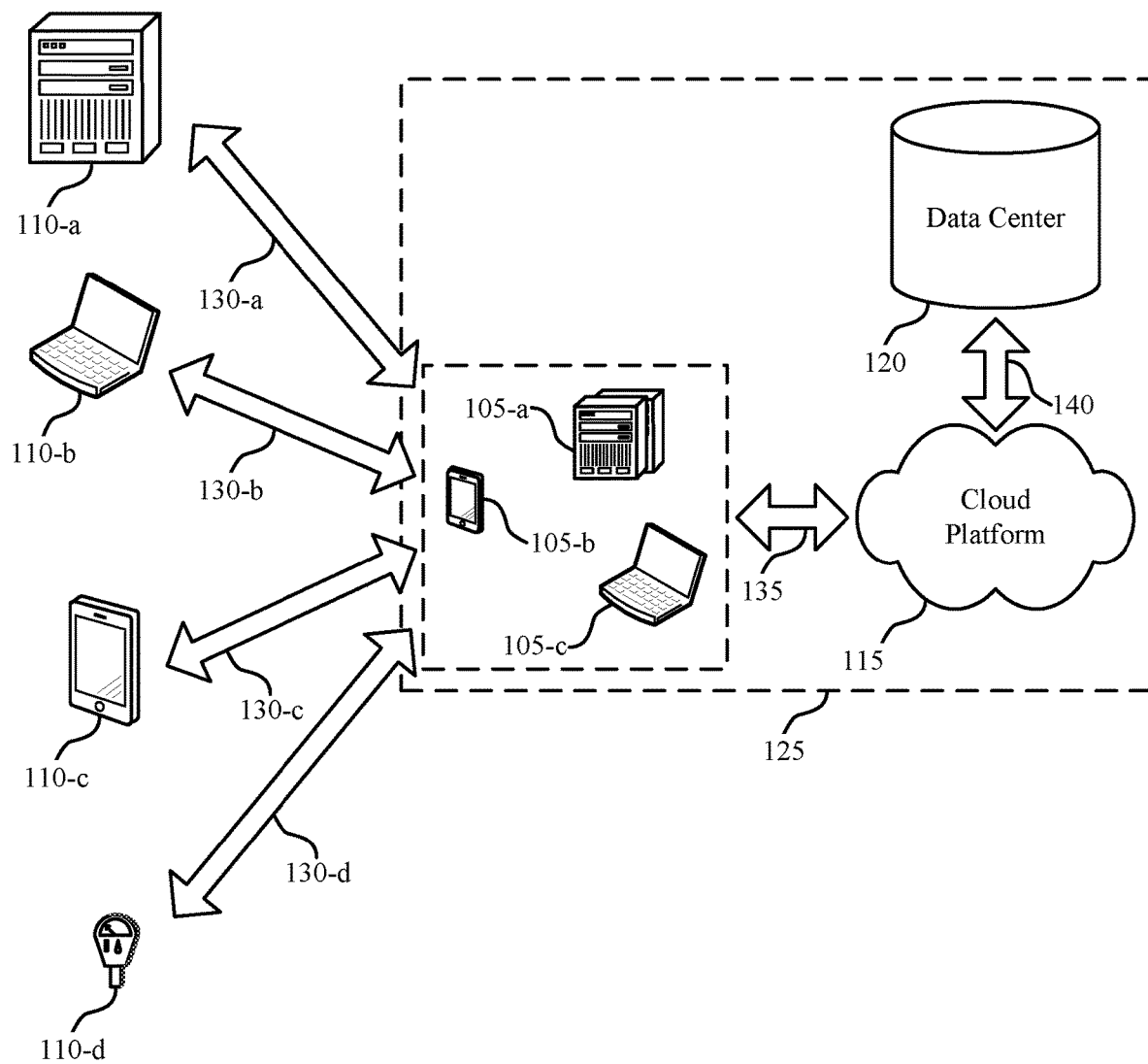
FIG. 1 illustrates an example of a system for data processing that supports generalizing a segment from user data attributes in accordance with aspects of the present disclosure.

In some examples, a cloud application may support a customer data platform (CDP). A CDP may include one or more applications and may support functionality to ingest data from multiple sources, parse and analyze the data to define and build segments of users based on attributes, and/or activate the segments to further track and analyze customers and their associated data (e.g., communication data, spending data, etc.) to further gain insights regarding a group of customers.

A CDP may include a data setup or import tool that facilitates the ingestion of different types of data from a variety of data sources into the CDP system (e.g., into a data lake). The data setup tool may support prepackaged data stream ingestion (e.g., based on data type and/or organized by channel type), and/or may support customized data ingestion techniques (e.g., extended data stream setup). The CDP data import tool may be configured to import data from a variety of disparate data sources or systems and may be configured to import different types of data (e.g., profile data and engagement/behavior data). Furthermore, the CDP data import tool may be configured for declarative use (e.g., via a guided setup wizard, or guided click-through menus or the like). As such, the CDP data import tool may support the ingestion of data without the involvement of information technology (IT) personnel, and/or without the need for custom-written codes.

The CDP may support the definition and deployment of segment profiles. For example, the CDP may support functionality to select attributes of an individual (e.g., via a user interface such as a tile) and then automatically suggest expression or definitions to leverage those selected attributes to define a more general segment of individuals. For example, the system may translate the selected attributes into editable Boolean expressions. Furthermore, the system may recommend transformations or normalizations of the values of the selected attributes to generalize the attribute definition in a meaningful way. These recommended transformations may be powered by machine learning and may improve over time. Furthermore, these suggested transformations may be easily editable so that a user can adjust from the recommended transformation as needed. Such functionality may facilitate the creation of general segment definitions from a single user in a declarative and efficient manner, without the need for advanced definition building through the use of code.

In some aspects, the CDP may support building advanced Boolean expression to define an audience segmentation. For example, the system may support the definition of segments that contain multiple 1-to-many attributes. This functionality may allow a user to segment audiences at a more granular level than possible in existing CRM systems (e.g., because segmenting on multiple 1-to-many attributes using a HAVING clause was not supported or possible). However, in accordance with aspects of the present disclosure, the CDP system may support such segment definitions and queries, and therefore the system may support building segments and performing queries on attributes where more than one attribute is searched for each record (e.g., a record containing both a first and a second attribute).

Aspects of the disclosure are initially described in the context of an environment supporting an on-demand database service. Aspects of the disclosure are further described with respect to a system diagram, and various UIs supporting segment identification. Aspects of the disclosure are further illustrated by and described with reference to apparatus diagrams, system diagrams, and flowcharts that relate to generalizing a segment from user data attributes.

FIG. 1 illustrates an example of a system 100 for cloud computing that supports generalizing a segment from user data attributes in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system.

In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a segmentation application accessible at one or more of the cloud clients 105. The segmentation application may be utilized to identify segments of user identifiers based on attributes associated with user identifiers. A user of a cloud client 105 may utilize the application to select a user profile as a basis for a segment of users. The server (e.g., data center 120) may generate one or more expressions based on the selected profile as well as attributes associated with the profile. The expression may include at least on normalization function for identifying attribute values correlated to a value of an attribute associated with the selected profile. A data storage system (e.g., data center 120) may be queried using the expression to identify additional user identifiers having attributes associated with the selected profile.

In some systems, due to the arrangement of stored data, the system may not be able support segmentation on multiple 1 to many attributes using a having clause. For example, a system may not support a query for segment identification based on an expression that has "purchased shoes in last year" and "attends sporting events."

Aspects described herein support segmentation using multiple 1 to many attribute queries. The segmentation application supports a user interface in which a user may select multiple different attribute selections and constraints such that the data server may return a segment matching a nested Boolean expression with different attributes.

Figure 2:
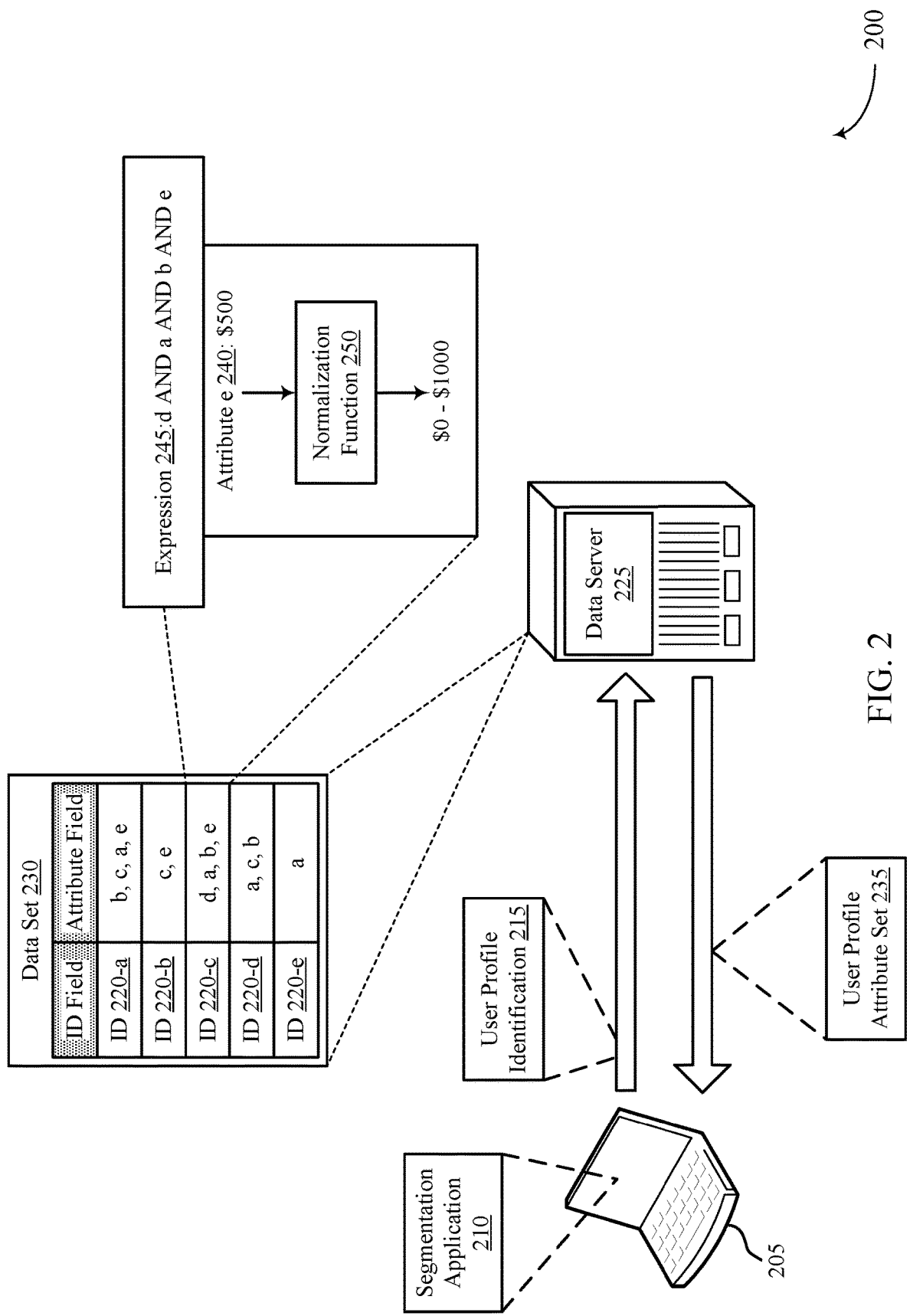
FIG. 2 illustrates an example of a system that supports generalizing a segment from user data attributes in accordance with aspects of the present disclosure.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 2 illustrates an example of a system 200 that supports generalizing a segment from user data attributes in accordance with various aspects of the present disclosure. The system 200 may implement aspects of FIG. 1. For example, system 200 includes a client device 205, which may be an example of a device at a cloud client 105 or contact 110. The system 200 further includes a data server 225, which may be an example of data subsystem 120 of FIG. 1. The data server 225, with various other components, supports segmentation application 210 accessible at client device 205. For example, a user (e.g., marketing manager, IT support user, administrator) of a cloud client 105 of FIG. 1 may access cloud platform 115 of FIG. 1 using the client device 205 and the segmentation application 210.

The segmentation application 210 may be utilized to initiate data segmentation identification at the data server 225. For example, the data server 225 may support automated or user activated segmentation identification. The data server may include a plurality of data sets, such as data set 230, with various object identifiers (e.g., user identifiers 220) associated with various attributes. Segmentation identification techniques may be utilized to identify interesting patterns of data objects within a data set. For example, a set of the user identifiers associated with an attribute "purchased item in the last year" may have an interesting, not obvious, pattern of other attributes associated with the user identifiers.

Each data object in the data set 230 may be identified based on a user identifier 220, and may be associated with one or more data attribute records. These data attribute records may be unique to that data object, or may be common across multiple data objects. In some cases, a user identifier 220 may be an example of a text string unique to that data object. For example, if the data objects correspond to users in the data server 225, the user identifier 220 may be user identification numbers, usernames, social security numbers, device identification, or some other similar form of ID where each value is unique to a user. The data attribute records may be examples of activities performed by a data object (e.g., a user) or characteristics of the data object. For example, the data attribute records may include information related to user devices operated by a user (e.g., internet protocol (IP) addresses, a total number of devices operated, etc.), information related to activities performed by the user while operating one of the user devices (e.g., web search histories, software application information, email communications, consumer data (purchases), etc.), information related specifically to the user (e.g., information from a user profile, values or scores associated with the user, etc.), or a combination thereof. As illustrated in FIG. 2, these different data attribute records may be represented by different letters (e.g., attribute records {a}, {b}, {c}, {d}, and {e}).

In the exemplary case illustrated, the data set 230 may include five data objects. The first data object with user identifier 220-*a* may include data attribute records{b, c, a, e}, the second data object with user identifier 220-*b* may include data attribute records {c, e}, the third data object with user identifier 220-*c* may include data attribute records {d, a, b, e}, the fourth data object with user identifier 220-*d* may include data attribute records {a, c, b}, and the fifth data object with user identifier 220-*e* may include data attribute record {a}. In one example, each data object may correspond to a different user or user device, and each data attribute record may correspond to an activity or activity parameter performed by the user or user device. For example, attribute record {a} may correspond to a user making a particular purchase online, while attribute record {b} may correspond to a user visiting a particular website in a web browser of a user device. These data attribute records may be binary values (e.g., Booleans) related to characteristics of a user.

A data processing machine of data server 225 may receive the data set 230 and classify the user identifiers 220 into one or more segments (e.g., groups, categories, classifications) of user identifiers. The classification may be based on the attribute records included with the data object. The segments may correspond to different records. For example, a segment may include user identifiers 220 that are associated with the attribute record {a}. Furthermore, the data server 225 may infer some attributes that are associated with user identifiers 220. For example, a user that has purchased a ticket to a sporting event and purchased a team jersey in the last six months may be attributed with a "sports fan" attribute record. These inferred attributes may be utilized to categorize user identifiers 220. User identifiers 220 may be members of zero, one, or many different segments as categorized by the data processing machine based on attributes.

In some cases, a user may identify an interesting user profile that may be utilized as a basis for generating a segment. For example, using segmentation application 210, the user may identify a user as a user profile identification 215, which may be transmitted to the data server 225. Based on the user profile identification 215, the data server 225 may identify a subset of data attributes associated with the identified user identifier. In some cases, an attribute set 235 may be surfaced to the user via the segmentation application 210. The user may select or adjust attributes or attribute values for generation of the segment. Based on the user profile and/or the selected or adjusted attributes, the data server 225 may generate an expression that may be used to identify an associated segment of user identifiers.

As illustrated in FIG. 2, the user profile identification 215 may identify user identifier 220-*c*, which is associated with attributes {d, a, b, e}. The user may select or adjust the attributes, and the data server 225 may generate an expression for the identifier 220-*c*. The expression 245 illustrates an example of each attribute associated with identifier 220-*c* as "d AND a AND b AND e." In some cases, the expression 245 may include a normalization function 250, which may be used to normalize a value or identify correlated values for a data attribute. In FIG. 2, a normalization function 250 is generated for attribute e, which may correspond to a spend amount (e.g., $500) by a user associated with user identifier 220-*c* in the past year. However, if the expression 245 were to identify other user identifiers having the exact spend amount of $500, then the identified segment may not be useful or may not include enough user identifiers. As such, a normalization function 250 may be generated that indicates a range of values (e.g., $0 to $1000) for the attribute. Thus, the segment identified based on the expression 245 and the normalization function may be more relevant. The normalization function may identify ranges (as illustrated in FIG. 2), thresholds, correlations, etc. As an example of a correlation, the data server 225 may be aware that users that have purchased red sporting apparel may have also purchased blue sporting apparel. Accordingly, a normalization function for a user that has purchased red apparel may also include an indication for users that have purchased blue apparel. Other normalization function types are contemplated.

Using the expression 245 generated based on the user identifier 220-c, the data server 225 may query the data set 230 to identify additional user identifiers based on the attributes associated with the additional user identifiers. The additional user identifiers may correspond to a segment of users associated with the selected user. The segment may be useful for marketing, sales, etc.

In some cases, the normalization function 250 may be generated using a machine learning model. For example, a machine learning model may be trained on various data sets including data set 230. The machine learning model may thus reflect various values for various attributes. Thus, when a particular attribute value is used for segment identification, the machine learning model may identify a range including the value such that correlated values are identified. In some cases, the model may use data clustering techniques to identify correlated values.

In some case, after the expression 245 is identified, the expression may be surfaced to a user via the segmentation application 210. The user may adjust the expression (e.g., adjust values), nest expressions, add or delete attributes, etc. using the segmentation application.

In some cases, a user may configure an expression 245 without first selecting a user profile or identifier. Accordingly, using the application 210, the user may configure nested expressions, which may be utilized to identify a segment of users.

Figure 3:
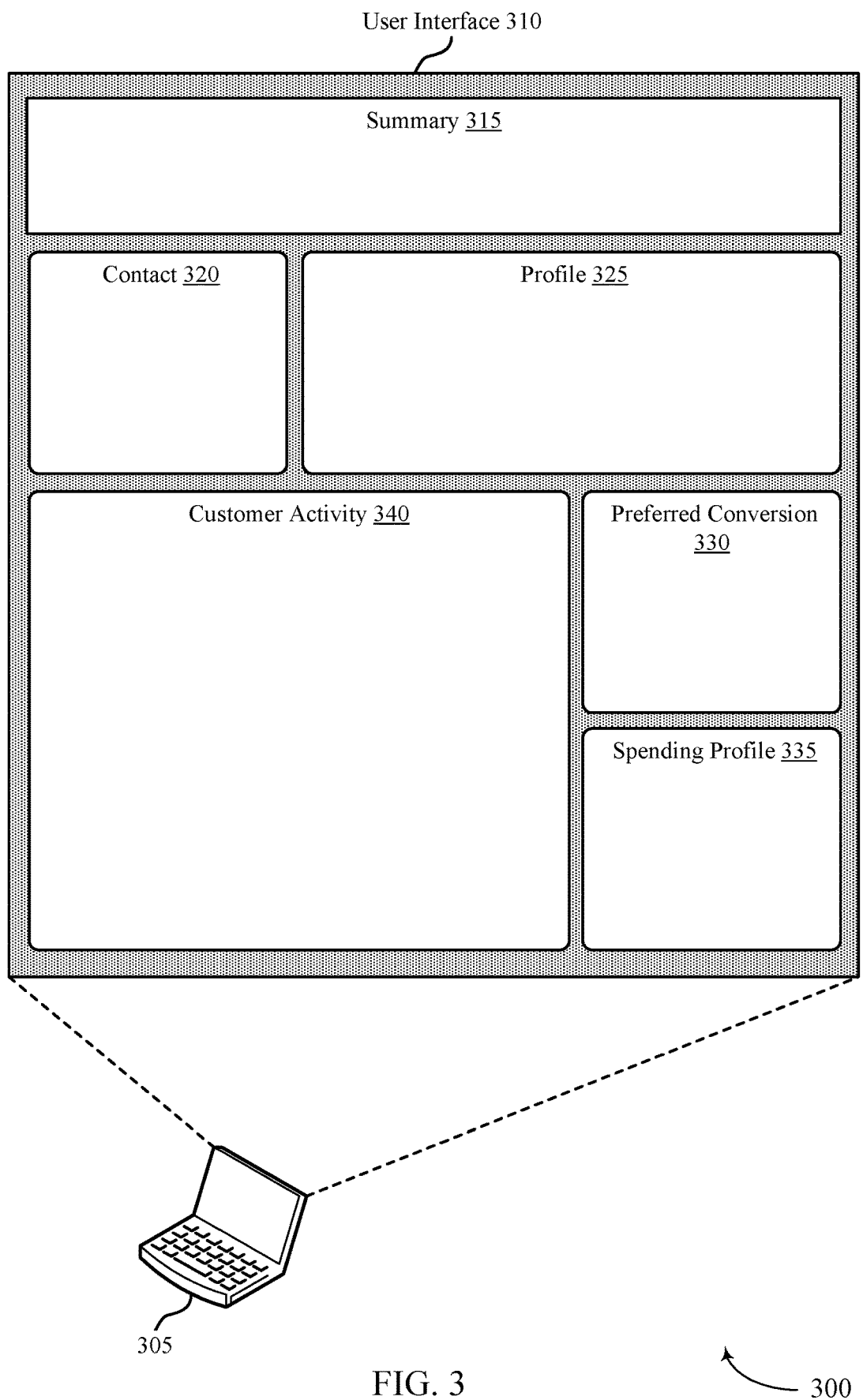
FIG. 3 illustrates an example of a user interface (UI) that supports generalizing a segment from user data attributes in accordance with aspects of the present disclosure.

FIG. 3 illustrates an example of a user device 305 including a UI 310 that supports generalizing a segment from user data attributes in accordance with aspects of the present disclosure. The UI 310 may be supported by a CDP application including segmentation application (e.g., segmentation application 210 of FIG. 2). The UI 310 includes various tiles showing profile data associated with a particular user. In some cases, the tiles may show various information such as a summary 315, a contact 320, a profile 325, a preferred conversion 330, a spending profile 335, or a customer activity 340. The UI 300 may additionally or alternatively include engagement information, activity information, transaction information, etc. However, it is to be understood that the user interface 310 represents an example user interface, and other user interface configurations are supported by the techniques and processes described herein.

A user (e.g., marketing administrator, manager, etc.) may want to create a segment of users with attributes similar to the attributes displayed at UI 310. The UI 310 may indicate attributes that the user may want to base a segment of users on. For example, the profile 325 may indicate a gender attribute (e.g., female) and an interest attribute (e.g., hiking). The spending profile 335 may indicate a spending attribute (e.g., big spender), and the customer activity 340 may indicate one or more activity attribute (e.g., online purchases, online searches, in-store purchases, etc.). The UI 310 may allow the user to quickly and efficiently identify attributes that can be used to base a segment of users on. In some cases, the user may identify one or more desirable attributes from UI 310, and UI 310 may show additional or alternative attributes associated with the identified one or more attributes. Thus, the UI 310 may allow the user to base a segment of users on the best attributes for the segment of users.

Figure 4:
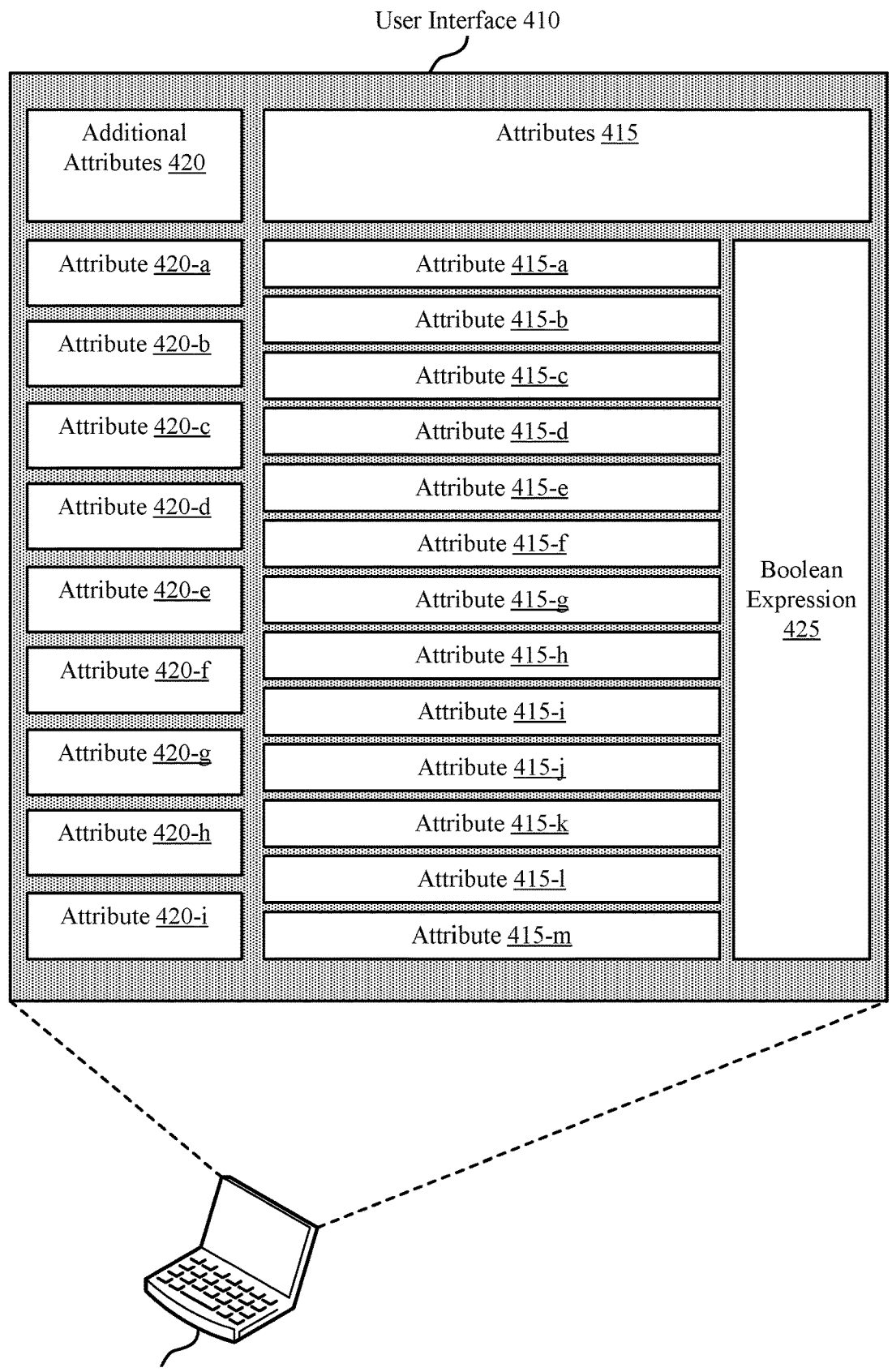
FIG. 4 illustrates an example of a UI that supports generalizing a segment from user data attributes in accordance with aspects of the present disclosure.

FIG. 4 illustrates an example of a user device 405 including a UI 410 that supports generalizing a segment from user data attributes in accordance with aspects of the present disclosure. The UI 410 may be supported by a CDP application including segmentation application (e.g., segmentation application 210 of FIG. 2). The UI 410 may display attributes associated with a particular user profile. A user of the application may adjust, delete, or add attributes associated with the user profile to generate segment. As the attributes are configured in UI 410, a segment of user profiles with similar attributes may have a number of (e.g., 0, 16, 100, etc.) user profiles. The user may add attributes by dragging attributes form the additional attributes 420. However, it is to be understood that the user interface 410 represents an example user interface, and other user interface configurations are supported by the techniques and processes described herein.

For example, the user may drag attribute 420-i into attributes 415. The additional attributes 420 (e.g., 420-a, 420-b, 420-c, 420-d, 420-e, 420-f, 420-g, 420-h, and 420-i) may be recently used attributes, attributes associated with attributes 415, popular attributes, new attributes, suggested attributes (e.g., attributes based on a machine learning model), or any combination thereof. Further, the user may select or change a Boolean expression 425 for the attributes. In some examples, the Boolean expression 425 may be an AND, an OR, a XOR, etc. For example, an AND expression may indicate the segment is based on all attributes (e.g., attribute 415-a, attribute 415-b, attribute 415-c, attribute 415-d, attribute 415-e, attribute 415-f, attribute 415-g, attribute 415-h, attribute 415-I, attribute 415-j, attribute 415-k, attribute 415-l, and attribute 415-m).

In some cases, the UI 410 may display a population size (e.g., a number of users associated with attributes 415) associated with a segment of user profiles. The UI 410 may additionally or alternatively display an indication of a change in the population size. For example, if the population size of the segment of user profiles is 16 and an additional user profile is added to the segment of user profiles, the population size may change to 17, and the user may be notified of the change. This segment of user profiles and/or population size may be determined on a schedule, in real-time, or in pseudo real-time. This may allow a user to maintain an understanding of the population size of one or more user profile segments, which may allow the user to identify changes and/or trends in user (e.g., user profile) behavior.

Figure 5:
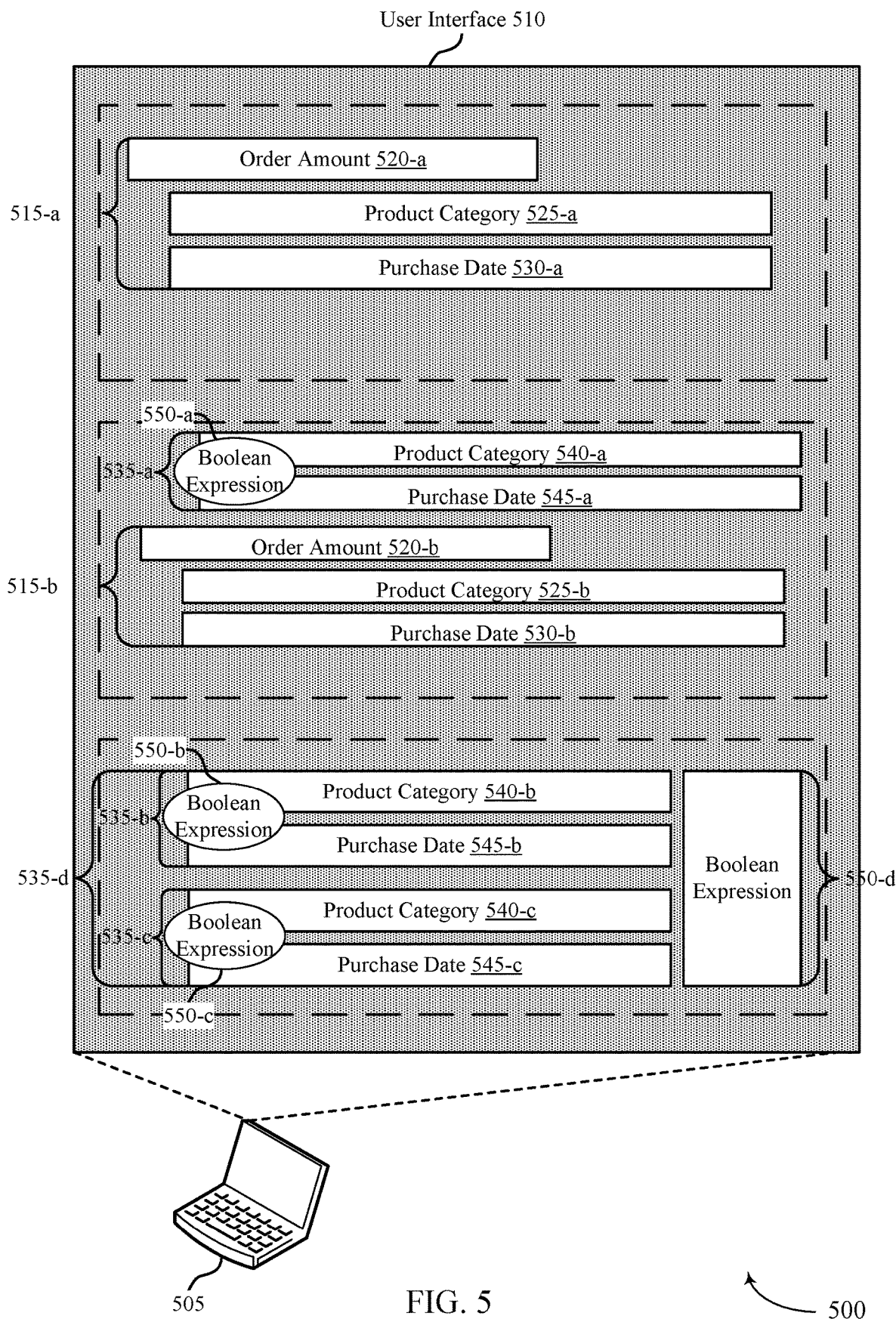
FIG. 5 illustrates an example of a UI that supports generalizing a segment from user data attributes in accordance with aspects of the present disclosure.

FIG. 5 illustrates an example of a user device 505 including a UI 100 that supports generalizing a segment from user data attributes in accordance with aspects of the present disclosure. The UI 510 may be supported by a CDP application including segmentation application (e.g., segmentation application 210 of FIG. 2). The UI 510 illustrates various components for building a Boolean expression using various attributes. However, it is to be understood that the user interface 510 represents an example user interface, and other user interface configurations are supported by the techniques and processes described herein.

At UI component 515-a, a user may input various attributes and values. For example, the user may select order amount 520-a (e.g., at least one), product category 525-a (e.g., shoes), purchase data 530-a (e.g., this year). The application may generate expression 535-a based on the input. At UI component 515-b, the user may input additional attributes and constraints. For example, the user may select order amount 520-b (e.g., of at least one), product category 525-b (e.g., coat), and purchase data 530-b (e.g., this year). The application may generate a second expression 53540-c based on the inputs. UI component 630 illustrates a nested expression 535-d including expression 535-b and expression 535-c, which are combined using a Boolean Expression 550-d (e.g., an AND operator). In some cases, Boolean expression 535-b and Boolean expression 535-a may be with same Boolean expression. The user may selectively change the various operators at UI 600. A query may be transmitted to a database system to identify user identifiers that match the Boolean expression 620.

Figure 6:
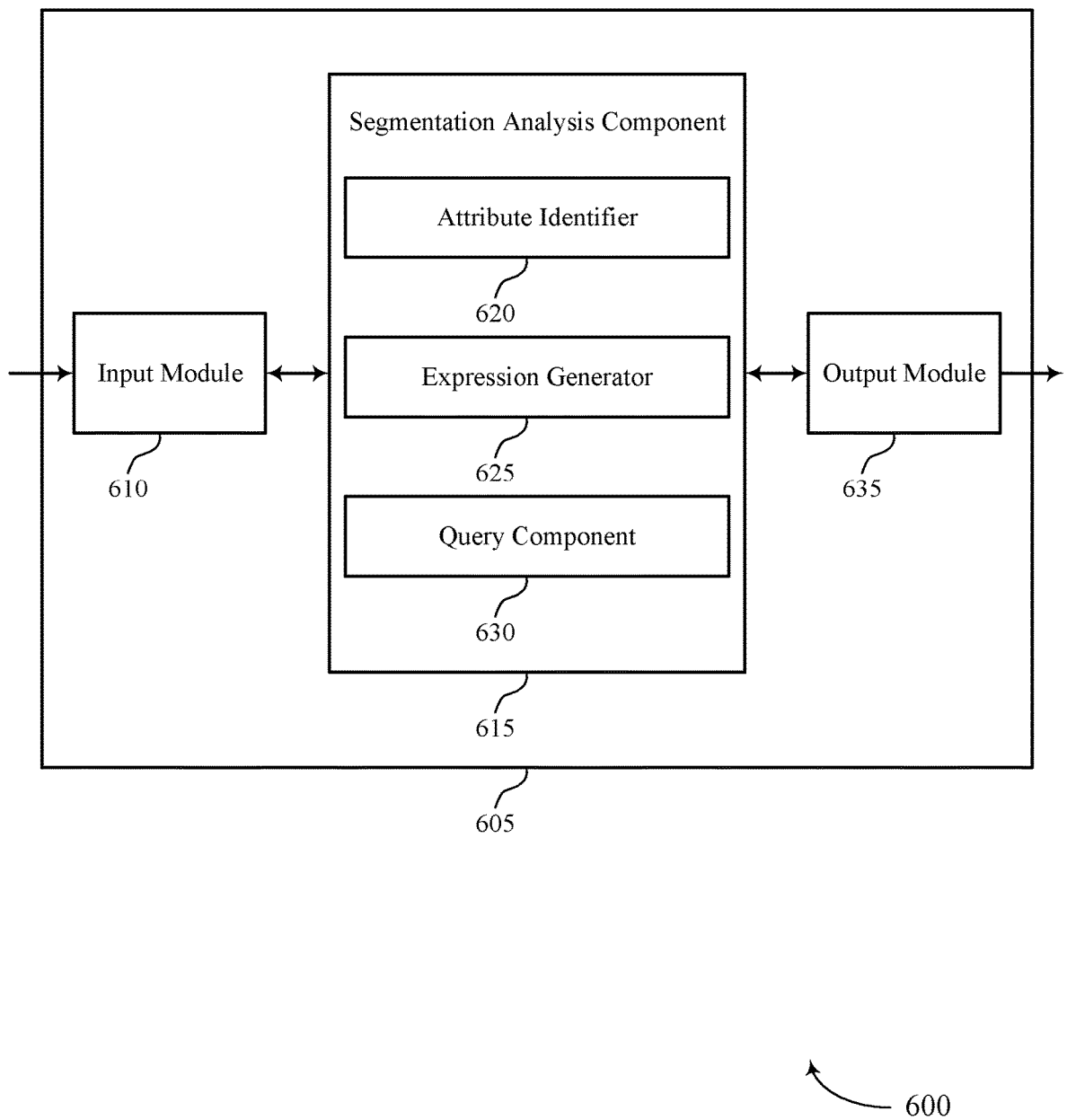
FIG. 6 shows a block diagram of an apparatus that supports generalizing a segment from user data attributes in accordance with aspects of the present disclosure.

FIG. 6 shows a block diagram 600 of an apparatus 605 that supports generalizing a segment from user data attributes in accordance with aspects of the present disclosure. The apparatus 605 may include an input module 610, an segmentation analysis component 615, and an output module 635. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the component 615 to support data retention handling for data object stores. In some cases, the input module 610 may be a component of an input/output (I/O) controller 815 as described with reference to FIG. 8.

The segmentation analysis component 615 may include an attribute identifier 620, an expression generator 625, and a query component 630. The segmentation analysis component 615 may be an example of aspects of the segmentation analysis component 705 or 810 described with reference to FIGS. 7 and 8.

The segmentation analysis component 615 and/or at least some of its various sub-components may be implemented in hardware, software executed by a processor, firmware, or any combination thereof. If implemented in software executed by a processor, the functions of the segmentation analysis component 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The segmentation analysis component 615 and/or at least some of its various sub-components may be physically located at various positions, including being distributed such that portions of functions are implemented at different physical locations by one or more physical devices. In some examples, the segmentation analysis component 615 and/or at least some of its various sub-components may be a separate and distinct component in accordance with various aspects of the present disclosure. In other examples, the segmentation analysis component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The attribute identifier 620 may identify a subset of a set of data attributes associated with a user identifier of a set of user identifiers stored in a data storage system.

The expression generator 625 may generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes.

The query component 630 may query the data storage system to identify additional user identifiers using the at least one expression, where the expression identifies the additional user identifiers based on data attributes associated with the additional user identifiers.

The output module 635 may manage output signals for the apparatus 605. For example, the output module 635 may receive signals from other components of the apparatus 605, such as the component 615, and may transmit these signals to other components or devices. In some specific examples, the output module 635 may transmit output signals for display in a user interface, for storage in a database or data store, for further processing at a server or server cluster, or for any other processes at any number of devices or systems. In some cases, the output module 635 may be a component of an I/O controller 815 as described with reference to FIG. 8.

Figure 7:
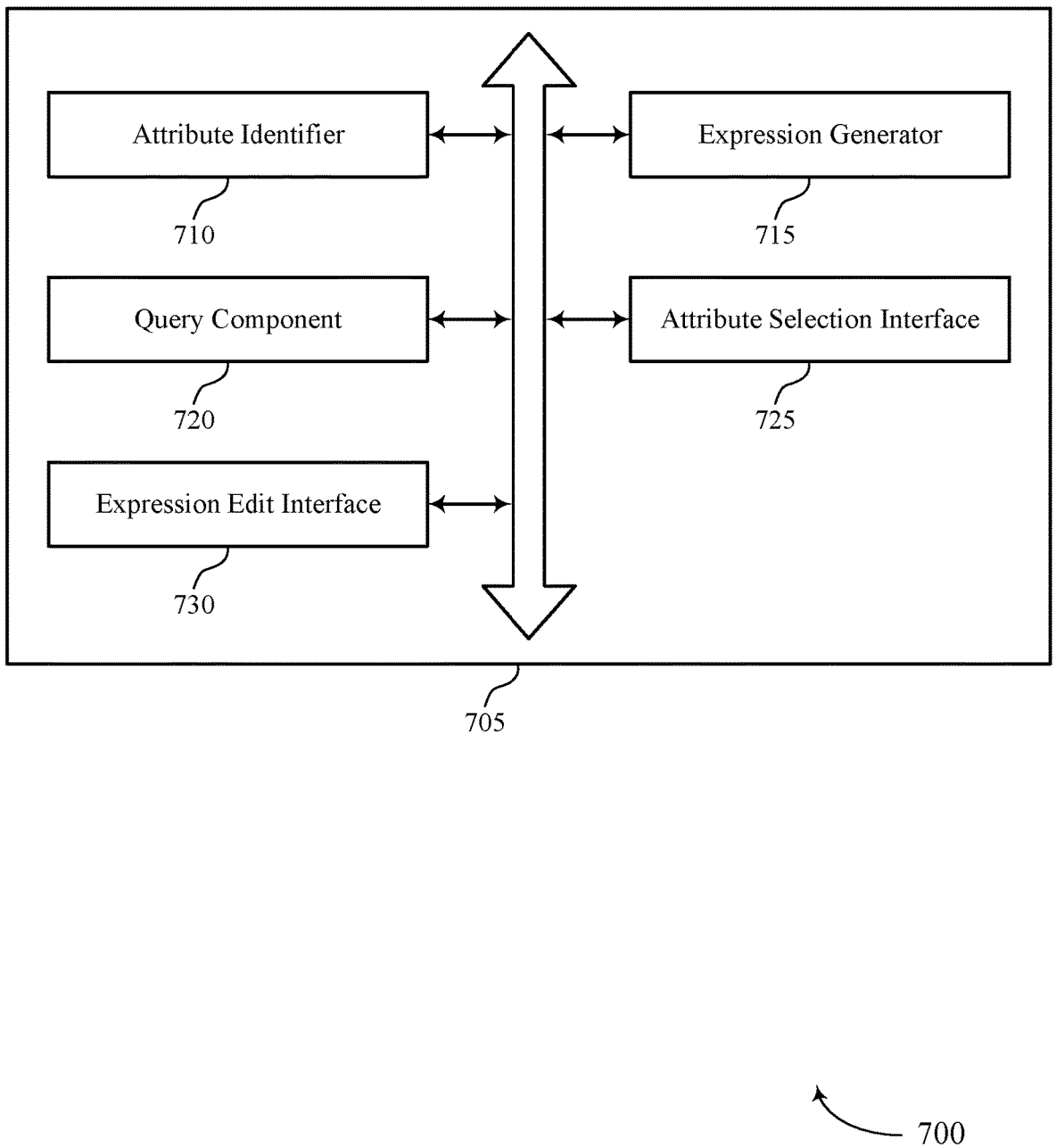
FIG. 7 shows a block diagram of a segmentation analysis component that supports generalizing a segment from user data attributes in accordance with aspects of the present disclosure.

FIG. 7 shows a block diagram 700 of a segmentation analysis component 705 that supports generalizing a segment from user data attributes in accordance with aspects of the present disclosure. The segmentation analysis component 705 may be an example of aspects of a segmentation analysis component 615 or a segmentation analysis component 810 described herein. The segmentation analysis component 705 may include an attribute identifier 710, an expression generator 715, a query component 720, an attribute selection interface 725, and an expression edit interface 730. Each of these modules may communicate, directly or indirectly, with one another (e.g., via one or more buses).

The attribute identifier 710 may identify a subset of a set of data attributes associated with a user identifier of a set of user identifiers stored in a data storage system.

The expression generator 715 may generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes.

In some cases, an expression of the at least one expression includes a Boolean expression.

In some cases, the Boolean expression includes an identification of user identifiers associated with a first attribute and an identification of user identifiers associated with a second attribute, where the query returns the additional user identifiers associated with both the first attribute and the second attribute.

In some cases, the at least one expression includes an expression identifying a value corresponding to a data attribute of the subset of data attributes.

In some cases, the normalization function is generated using a predictive procedure.

In some cases, the normalization function identifies the correlated data attribute values based on ranges corresponding to the one or more data attributes.

The query component 720 may query the data storage system to identify additional user identifiers using the at least one expression, where the expression identifies the additional user identifiers based on data attributes associated with the additional user identifiers.

The attribute selection interface 725 may receive, at the data storage system, a selection of the one or more of the subset of data attributes, where the selection is received at a tile of user interface displaying the set of data attributes associated with the user identifier.

In some examples, the attribute selection interface 725 may receive, at the data storage system, a selection of the user identifier of the set of user identifiers, where the subset of the set of data attributes are identified responsive to the selection of the user identifier.

The expression edit interface 730 may trigger display of the at least one expression at a user interface, where the at least one expression is editable at the user interface.

Figure 8:
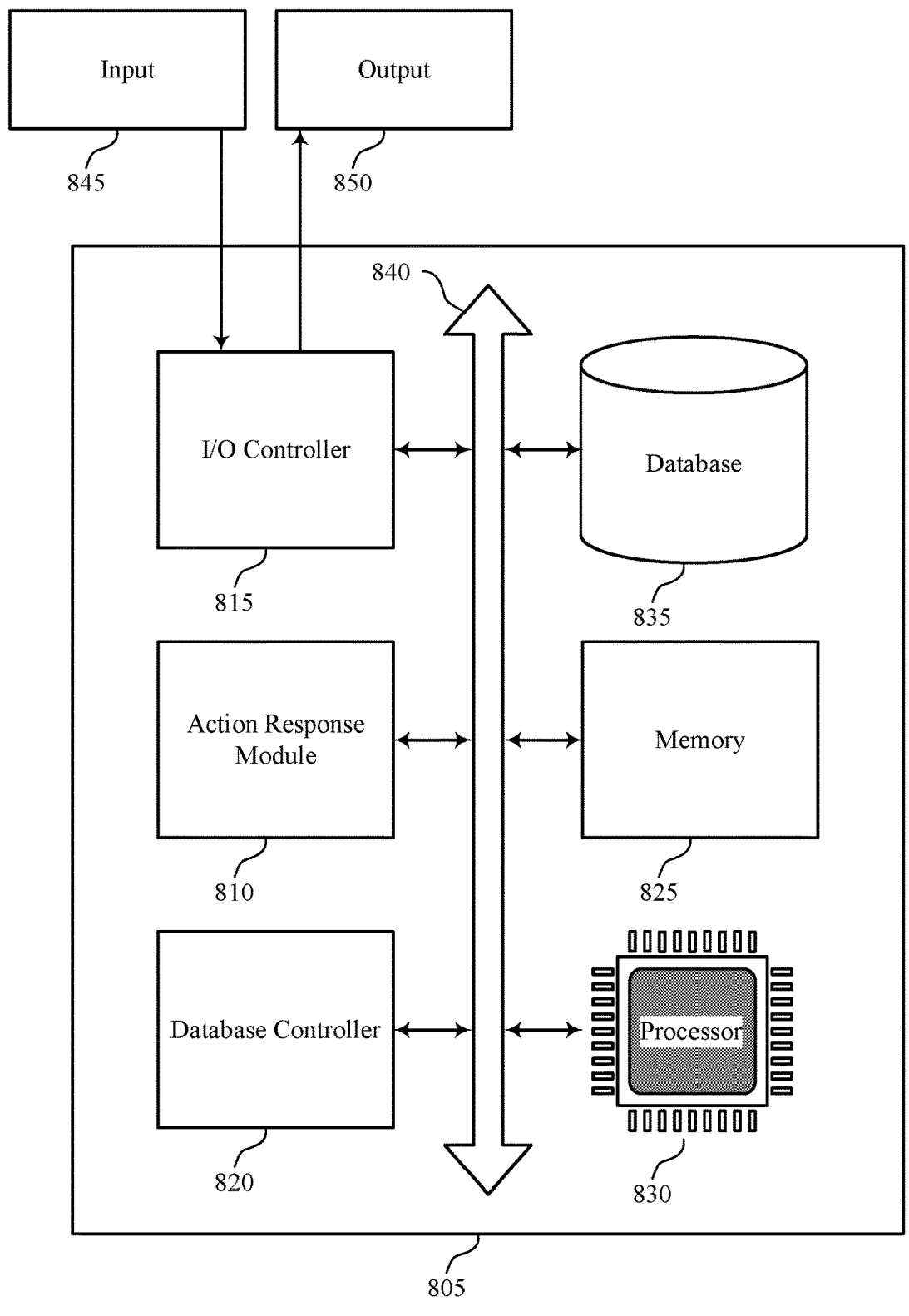
FIG. 8 shows a diagram of a system including a device that supports generalizing a segment from user data attributes in accordance with aspects of the present disclosure.

FIG. 8 shows a diagram of a system 800 including a device 805 that supports generalizing a segment from user data attributes in accordance with aspects of the present disclosure. The device 805 may be an example of or include the components of an application server or an apparatus 605 as described herein. The device 805 may include components for bi-directional data communications including components for transmitting and receiving communications, including an segmentation analysis component 810, an I/O controller 815, a database controller 820, memory 825, a processor 830, and a database 835. These components may be in electronic communication via one or more buses (e.g., bus 840).

The segmentation analysis component 810 may be an example of a segmentation analysis component 615 or 705 as described herein. For example, the segmentation analysis component 810 may perform any of the methods or processes described above with reference to FIGS. 6 and 7. In some cases, the segmentation analysis component 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting generalizing a segment from user data attributes).

Figure 9:
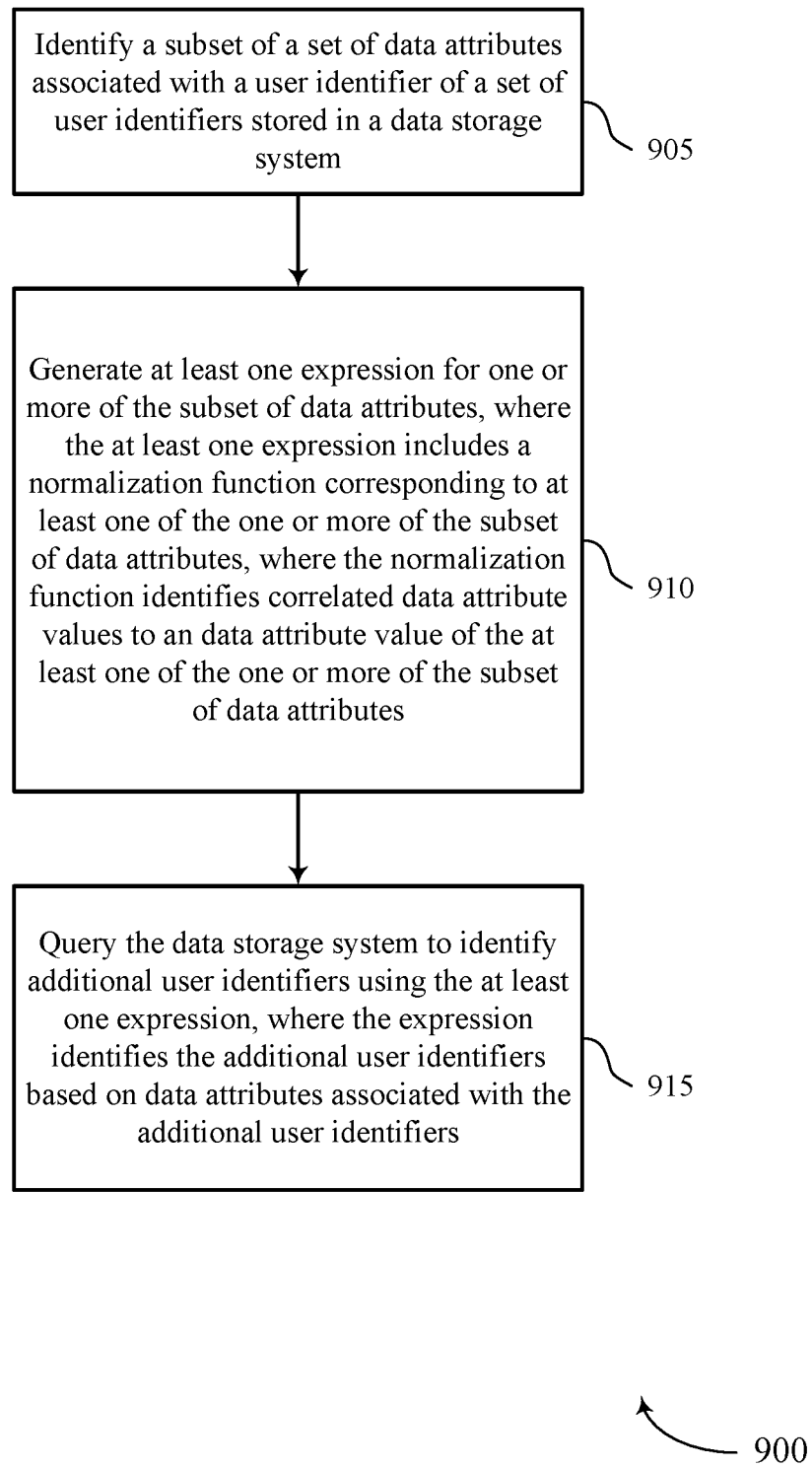
FIGS. 9 through 11 show flowcharts illustrating methods that support generalizing a segment from user data attributes in accordance with aspects of the present disclosure.

FIG. 9 shows a flowchart illustrating a method 900 that supports generalizing a segment from user data attributes in accordance with aspects of the present disclosure. The operations of method 900 may be implemented by an application server or its components as described herein. For example, the operations of method 900 may be performed by a segmentation analysis component as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may identify a subset of a set of data attributes associated with a user identifier of a set of user identifiers stored in a data storage system. The operations of 905 may be performed according to the methods described herein. In some examples, aspects of the operations of 905 may be performed by an attribute identifier as described with reference to FIGS. 6 through 8.

At 910, the application server may generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes. The operations of 910 may be performed according to the methods described herein. In some examples, aspects of the operations of 910 may be performed by an expression generator as described with reference to FIGS. 6 through 8.

At 915, the application server may query the data storage system to identify additional user identifiers using the at least one expression, where the expression identifies the additional user identifiers based on data attributes associated with the additional user identifiers. The operations of 915 may be performed according to the methods described herein. In some examples, aspects of the operations of 915 may be performed by a query component as described with reference to FIGS. 6 through 8.

Figure 10:
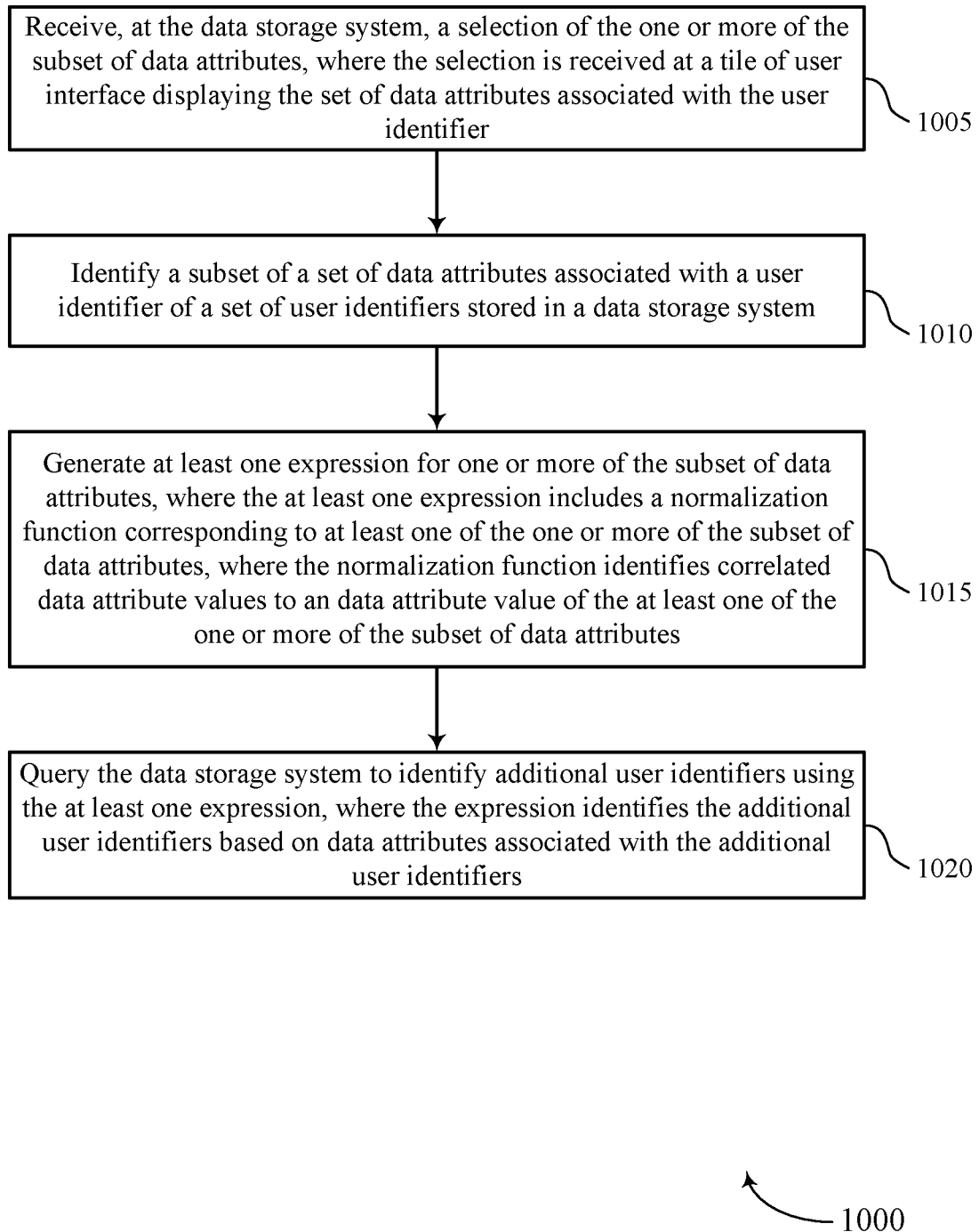

FIG. 10 shows a flowchart illustrating a method 1000 that supports generalizing a segment from user data attributes in accordance with aspects of the present disclosure. The operations of method 1000 may be implemented by an application server or its components as described herein. For example, the operations of method 1000 may be performed by a segmentation analysis component as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may receive, at the data storage system, a selection of the one or more of the subset of data attributes, where the selection is received at a tile of user interface displaying the set of data attributes associated with the user identifier. The operations of 1005 may be performed according to the methods described herein. In some examples, aspects of the operations of 1005 may be performed by an attribute selection interface as described with reference to FIGS. 6 through 8.

At 1010, the application server may identify a subset of a set of data attributes associated with a user identifier of a set of user identifiers stored in a data storage system. The operations of 1010 may be performed according to the methods described herein. In some examples, aspects of the operations of 1010 may be performed by an attribute identifier as described with reference to FIGS. 6 through 8.

At 1015, the application server may generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes. The operations of 1015 may be performed according to the methods described herein. In some examples, aspects of the operations of 1015 may be performed by an expression generator as described with reference to FIGS. 6 through 8.

At 1020, the application server may query the data storage system to identify additional user identifiers using the at least one expression, where the expression identifies the additional user identifiers based on data attributes associated with the additional user identifiers. The operations of 1020 may be performed according to the methods described herein. In some examples, aspects of the operations of 1020 may be performed by a query component as described with reference to FIGS. 6 through 8.

Figure 11:
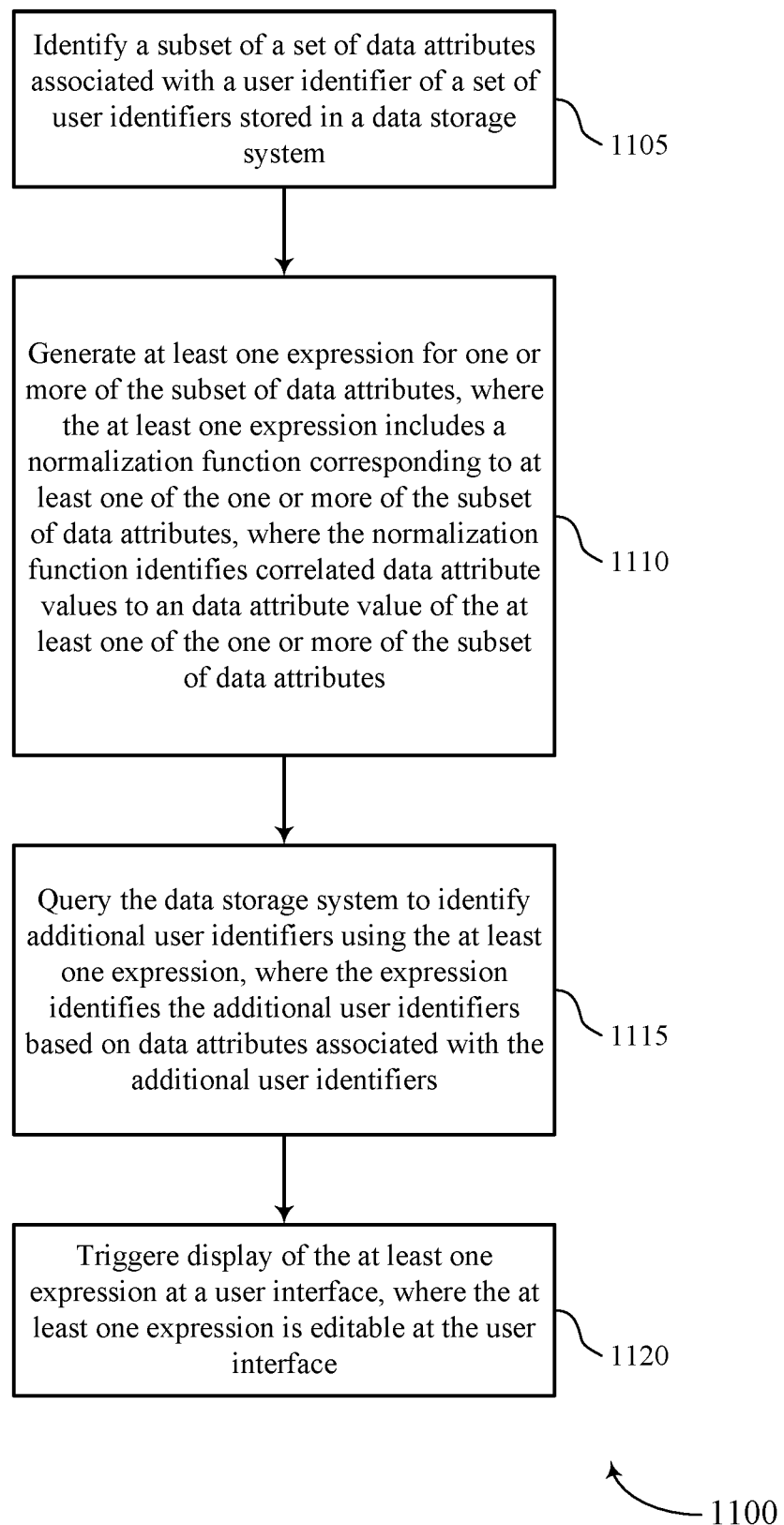

FIG. 11 shows a flowchart illustrating a method 1100 that supports generalizing a segment from user data attributes in accordance with aspects of the present disclosure. The operations of method 1100 may be implemented by an application server or its components as described herein. For example, the operations of method 1100 may be performed by a segmentation analysis component as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may identify a subset of a set of data attributes associated with a user identifier of a set of user identifiers stored in a data storage system. The operations of 1105 may be performed according to the methods described herein. In some examples, aspects of the operations of 1105 may be performed by an attribute identifier as described with reference to FIGS. 6 through 8.

At 1110, the application server may generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes. The operations of 1110 may be performed according to the methods described herein. In some examples, aspects of the operations of 1110 may be performed by an expression generator as described with reference to FIGS. 6 through 8.

At 1115, the application server may query the data storage system to identify additional user identifiers using the at least one expression, where the expression identifies the additional user identifiers based on data attributes associated with the additional user identifiers. The operations of 1115 may be performed according to the methods described herein. In some examples, aspects of the operations of 1115 may be performed by a query component as described with reference to FIGS. 6 through 8.

At 1120, the application server may trigger display of the at least one expression at a user interface, where the at least one expression is editable at the user interface. The operations of 1120 may be performed according to the methods described herein. In some examples, aspects of the operations of 1120 may be performed by an expression edit interface as described with reference to FIGS. 6 through 8.

A method of data processing is described. The method may include identifying a subset of a set of data attributes associated with a user identifier of a set of user identifiers stored in a data storage system, generating at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes, and querying the data storage system to identify additional user identifiers using the at least one expression, where the expression identifies the additional user identifiers based on data attributes associated with the additional user identifiers.

An apparatus for data processing is described. The apparatus may include a processor, memory coupled with the processor, and instructions stored in the memory. The instructions may be executable by the processor to cause the apparatus to identify a subset of a set of data attributes associated with a user identifier of a set of user identifiers stored in a data storage system, generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes, and query the data storage system to identify additional user identifiers using the at least one expression, where the expression identifies the additional user identifiers based on data attributes associated with the additional user identifiers.

Another apparatus for data processing is described. The apparatus may include means for identifying a subset of a set of data attributes associated with a user identifier of a set of user identifiers stored in a data storage system, generating at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes, and querying the data storage system to identify additional user identifiers using the at least one expression, where the expression identifies the additional user identifiers based on data attributes associated with the additional user identifiers.

A non-transitory computer-readable medium storing code for data processing is described. The code may include instructions executable by a processor to identify a subset of a set of data attributes associated with a user identifier of a set of user identifiers stored in a data storage system, generate at least one expression for one or more of the subset of data attributes, where the at least one expression includes a normalization function corresponding to at least one of the one or more of the subset of data attributes, where the normalization function identifies correlated data attribute values to an data attribute value of the at least one of the one or more of the subset of data attributes, and query the data storage system to identify additional user identifiers using the at least one expression, where the expression identifies the additional user identifiers based on data attributes associated with the additional user identifiers.

In some examples of the method, apparatuses, and non-transitory computer-readable medium described herein, an expression of the at least one expression includes a Boolean expression.

In some examples of the method, apparatuses, and non-transitory computer-readable medium described herein, the Boolean expression includes an identification of user identifiers associated with a first attribute and an identification of user identifiers associated with a second attribute, where the query returns the additional user identifiers associated with both the first attribute and the second attribute.

Some examples of the method, apparatuses, and non-transitory computer-readable medium described herein may further include operations, features, means, or instructions for receiving, at the data storage system, a selection of the one or more of the subset of data attributes, where the selection may be received at a tile of user interface displaying the set of data attributes associated with the user identifier.

Some examples of the method, apparatuses, and non-transitory computer-readable medium described herein may further include operations, features, means, or instructions for receiving, at the data storage system, a selection of the user identifier of the set of user identifiers, where the subset of the set of data attributes may be identified responsive to the selection of the user identifier.

In some examples of the method, apparatuses, and non-transitory computer-readable medium described herein, the at least one expression includes an expression identifying a value corresponding to a data attribute of the subset of data attributes.

In some examples of the method, apparatuses, and non-transitory computer-readable medium described herein, the normalization function may be generated using a predictive procedure.

In some examples of the method, apparatuses, and non-transitory computer-readable medium described herein, the normalization function identifies the correlated data attribute values based on ranges corresponding to the one or more data attributes.

Some examples of the method, apparatuses, and non-transitory computer-readable medium described herein may further include operations, features, means, or instructions for triggering display of the at least one expression at a user interface, where the at least one expression may be editable at the user interface.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   identifying a subset of a plurality of data attributes associated with a user identifier of a plurality of user identifiers stored in a data storage system, wherein the subset of data attributes are identified as a basis for generating a segment of user identifiers;
   generating at least one expression for one or more of the subset of data attributes, wherein the at least one expression includes a normalization function corresponding to at least one of the one or more of the subset of data attributes, wherein the normalization function identifies correlated data attribute values to a data attribute value of the at least one of the one or more of the subset of data attributes, and wherein an expression of the at least one expression comprises a Boolean expression that is configured to identify user identifiers associated with a first attribute and user identifiers associated with a second attribute; and
   querying the data storage system to identify additional user identifiers to generate the segment of user identifiers using the at least one expression, wherein the expression identifies the additional user identifiers based on data attributes associated with the additional user identifiers, and wherein the querying returns the additional user identifiers that are associated with both the first attribute and the second attribute.

2. The method of claim 1, further comprising:
   receiving, at the data storage system, a selection of the one or more of the subset of data attributes, wherein the selection is received at a tile of user interface displaying the plurality of data attributes associated with the user identifier.

3. The method of claim 1, further comprising:
   receiving, at the data storage system, a selection of the user identifier of the plurality of user identifiers, wherein the subset of the plurality of data attributes are identified responsive to the selection of the user identifier.

4. The method of claim 1, wherein the at least one expression includes an expression identifying a value corresponding to a data attribute of the subset of data attributes.

5. The method of claim 1, wherein the normalization function is generated using a machine learning predictive procedure.

6. The method of claim 1, wherein the normalization function identifies the correlated data attribute values based on ranges corresponding to the one or more of the subset of data attributes.

7. The method of claim 1, further comprising:
   triggering display of the at least one expression at a user interface, wherein the at least one expression is editable at the user interface.

8. An apparatus for data processing, comprising:
   a processor,
   memory coupled with the processor; and
   instructions stored in the memory and executable by the processor to cause the apparatus to:
   identify a subset of a plurality of data attributes associated with a user identifier of a plurality of user identifiers stored in a data storage system, wherein the subset of data attributes are identified as a basis for generating a segment of user identifiers;
   generate at least one expression for one or more of the subset of data attributes, wherein the at least one expression includes a normalization function corresponding to at least one of the one or more of the subset of data attributes, wherein the normalization function identifies correlated data attribute values to a data attribute value of the at least one of the one or more of the subset of data attributes, and wherein an expression of the at least one expression comprises a Boolean expression that is configured to identify user identifiers associated with a first attribute and user identifiers associated with a second attribute; and
   query the data storage system to identify additional user identifiers to generate the segment of user identifiers using the at least one expression, wherein the expression identifies the additional user identifiers based on data attributes associated with the additional user identifiers, and wherein the query returns the additional user identifiers that are associated with both the first attribute and the second attribute.

9. The apparatus of claim 8, wherein the instructions are further executable by the processor to cause the apparatus to:

receive, at the data storage system, a selection of the one or more of the subset of data attributes, wherein the selection is received at a tile of user interface displaying the plurality of data attributes associated with the user identifier.

10. The apparatus of claim 8, wherein the instructions are further executable by the processor to cause the apparatus to:
receive, at the data storage system, a selection of the user identifier of the plurality of user identifiers, wherein the subset of the plurality of data attributes are identified responsive to the selection of the user identifier.

11. The apparatus of claim 8, wherein the at least one expression includes an expression identifying a value corresponding to a data attribute of the subset of data attributes.

12. The apparatus of claim 8, wherein the normalization function is generated using a machine learning predictive procedure.

13. The apparatus of claim 8, wherein the normalization function identifies the correlated data attribute values based on ranges corresponding to the one or more of the subset of data attributes.

14. The apparatus of claim 8, wherein the instructions are further executable by the processor to cause the apparatus to:
trigger display of the at least one expression at a user interface, wherein the at least one expression is editable at the user interface.

15. A non-transitory computer-readable medium storing code for data processing, the code comprising instructions executable by a processor to:

identify a subset of a plurality of data attributes associated with a user identifier of a plurality of user identifiers stored in a data storage system, wherein the subset of data attributes are identified as a basis for generating a segment of user identifiers;

generate at least one expression for one or more of the subset of data attributes, wherein the at least one expression includes a normalization function corresponding to at least one of the one or more of the subset of data attributes, wherein the normalization function identifies correlated data attribute values to a data attribute value of the at least one of the one or more of the subset of data attributes, and wherein an expression of the at least one expression comprises a Boolean expression that is configured to identify user identifiers associated with a first attribute and user identifiers associated with a second attribute; and query the data storage system to identify additional user identifiers to generate the segment of user identifiers using the at least one expression, wherein the expression identifies the additional user identifiers based on data attributes associated with the additional user identifiers, and wherein the query returns the additional user identifiers that are associated with both the first attribute and the second attribute.

\* \* \* \* \*